US010192569B1

(12) United States Patent
Indyk et al.

(10) Patent No.: US 10,192,569 B1
(45) Date of Patent: Jan. 29, 2019

(54) INFORMING A SUPPORT AGENT OF A PARALINGUISTIC EMOTION SIGNATURE OF A USER

(71) Applicant: INTUIT INC., Mountain View, CA (US)

(72) Inventors: Benjamin Indyk, San Diego, CA (US); Igor A. Podgorny, Mountain View, CA (US); Raymond Chan, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/336,113

(22) Filed: Oct. 27, 2016

(51) Int. Cl.
| | |
|---|---|
| *G10L 25/87* | (2013.01) |
| *G10L 25/63* | (2013.01) |
| *G10L 15/18* | (2013.01) |
| *G10L 15/22* | (2006.01) |
| *H04M 3/51* | (2006.01) |
| *H04M 3/42* | (2006.01) |
| *H04L 29/06* | (2006.01) |

(52) U.S. Cl.
CPC .......... *G10L 25/87* (2013.01); *G10L 15/1815* (2013.01); *G10L 15/22* (2013.01); *G10L 25/63* (2013.01); *H04M 3/42042* (2013.01); *H04M 3/5183* (2013.01); *H04L 65/4069* (2013.01)

(58) Field of Classification Search
USPC .................. 704/246, 247, 251, 252, 275
See application file for complete search history.

(56) References Cited

U.S. PATENT DOCUMENTS

| | | | | |
|---|---|---|---|---|
| 7,003,079 | B1 * | 2/2006 | McCarthy ........... | H04M 3/2227 379/265.02 |
| 8,676,586 | B2 * | 3/2014 | Wasserblat .......... | H04M 3/5232 704/270 |
| 8,837,706 | B2 * | 9/2014 | Odinak ............... | H04M 3/5175 379/265.01 |
| 9,269,374 | B1 * | 2/2016 | Conway ............. | G06K 9/00302 |
| 2010/0070276 | A1 * | 3/2010 | Wasserblat .............. | G10L 15/18 704/243 |
| 2014/0270140 | A1 * | 9/2014 | Conway ............. | H04M 3/5175 379/265.07 |

(Continued)

*Primary Examiner* — Leonard Saint Cyr
(74) *Attorney, Agent, or Firm* — Patterson + Sheridan, LLP

(57) ABSTRACT

Techniques are disclosed for assisting a support agent based on paralinguistic information determined from a user interacting with a software application. One embodiment presented herein includes a computer-implemented method. The method includes receiving, at a computing device, an audio stream including audio of a user interacting with an application. The method also includes evaluating the audio stream to identify a collection of paralinguistic information present in the audio stream. The paralinguistic information includes a set of descriptors characterizing acoustic aspects of the audio that are distinct from verbal content of the audio. The method further includes determining, from the paralinguistic information, attribute measures associated with the user interacting with the application. Upon receiving a request to initiate a support encounter, the method includes informing a support agent assigned to handle the support encounter of the attribute measures determined from the paralinguistic information.

20 Claims, 9 Drawing Sheets

(56) References Cited

U.S. PATENT DOCUMENTS

| | | | | |
|---|---|---|---|---|
| 2015/0003605 A1* | 1/2015 | Odinak | ............... | H04M 3/5175 379/266.07 |
| 2015/0281445 A1* | 10/2015 | Kumar | ................ | H04M 3/5166 379/88.01 |
| 2015/0334236 A1* | 11/2015 | Conway | .............. | H04M 3/5175 379/265.09 |
| 2016/0021250 A1* | 1/2016 | Kumar | ................ | H04M 3/5232 379/88.01 |
| 2016/0227036 A1* | 8/2016 | Warford | ............. | H04M 3/5175 |
| 2016/0337519 A1* | 11/2016 | Conway | .............. | H04M 3/5175 |
| 2017/0125008 A1* | 5/2017 | Maisonnier | ............ | B25J 11/003 |

* cited by examiner

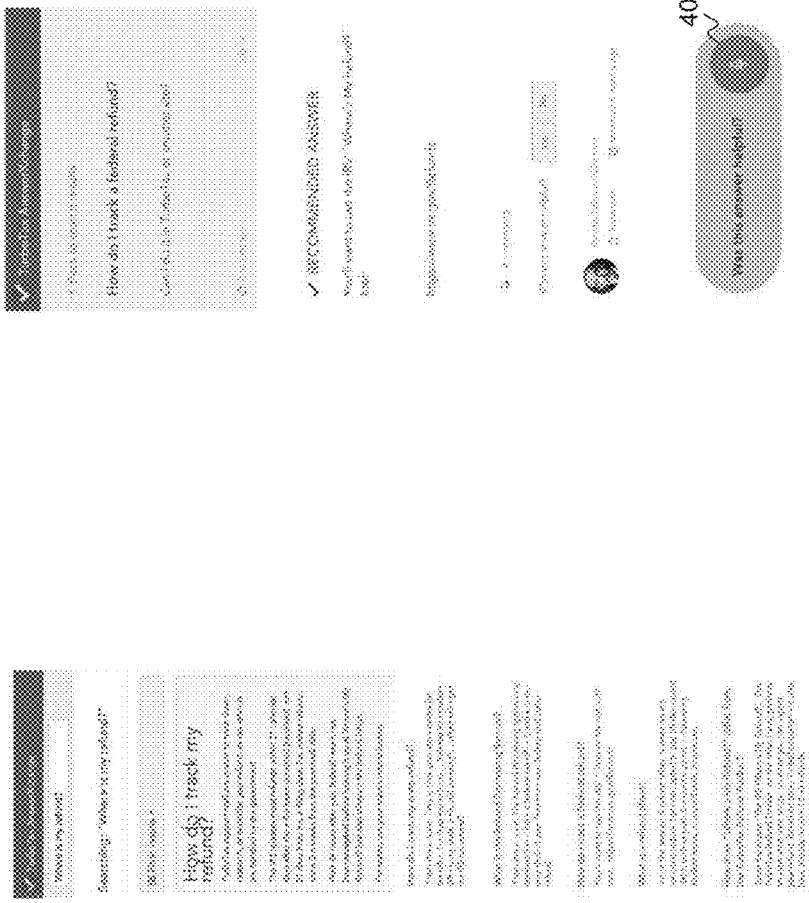

INFORMING A SUPPORT AGENT OF A PARALINGUISTIC EMOTION SIGNATURE OF A USER

FIELD

The present disclosure relates to techniques for assisting a support agent with a support encounter with a user based on paralinguistic information extracted from voice/speech of the user.

BACKGROUND

Complex software applications and services are frequently made available to users over computer networks, such as the Internet. For example, software applications used to prepare and file income tax returns are frequently offered as an online service. In addition to generating tax return documents, these online services typically guide a user through a collection of complex interactive workflows in order to prepare a complete, valid income tax return.

Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications which allow users to complete mortgage applications or apply for home, life, or automobile insurance. Further, some online services include voice recognition software that can process users' voice/speech. For example, users can interact with the online service with voice/speech to initiate services or processes in the online service, navigate application content provided by the online service, etc.

In addition to these transactional online services, a variety of complex software tools offer users access to both online services and local client applications, e.g., financial accounting software, video editing or media composition software, software development tools, etc. Such applications may allow users to access application features and user data stored online, regardless of whether the application is installed locally by an end user or accessed as an online service. Once customer data is stored by a service provider, end users can access their data using a variety of clients, including a web browser used to access a software application as a series of web pages, dedicated "thin" client applications, and so-called "apps" accessed using a mobile telephone or computing tablet.

Further, some online services include assisted support software that allows users to request help from the online service. Such assisted support can be automated including, for example, an automated software agent that can perform tasks or services for users (e.g., such as searching application content, responding (with automated voice/speech) to users' questions, etc.). In addition, such assisted support provides users with the option to interact with "live" customer support agents. For example, support agents can assist users in accomplishing a given task (e.g., guiding users through a tax preparation workflow provided by the service), explain a given feature, troubleshoot problems encountered by the user, and the like. Further, the assisted support software can provide screen sharing support for users. For example, agents can use screen sharing to control users' devices and application content provided by the online service. For popular application and services, the interaction between support agents and users can represent a large part of the overall customer experience provided to users.

SUMMARY

One embodiment presented herein includes a computer-implemented method for assisting a support agent assigned to interact with a user during a support encounter. The method includes receiving, at a computing device, an audio stream including audio of a user interacting with an application. The method also includes evaluating the audio stream to identify a collection of paralinguistic information present in the audio stream. The paralinguistic information includes a set of descriptors characterizing acoustic aspects of the audio that are distinct from verbal content of the audio. The method further includes determining, from the paralinguistic information, attribute measures associated with the user interacting with the application. Upon receiving a request to initiate a support encounter, the method includes informing a support agent assigned to handle the support encounter of the attribute measures determined from the paralinguistic information.

The method further includes determining, based on at least one of the attribute measures, one or more activities for the support agent to use when interacting with the user that increase a likelihood of achieving a specified outcome for the support encounter. Once determined, the method includes notifying the support agent of the one or more activities. The one or more activities include at least one of identifying first content items to the user, and avoiding presenting second content items to the user.

Additional embodiments include a computing device having a processor and a memory storing one or more application programs configured to perform the methods disclosed herein and a computer-readable storage medium storing instructions, which when executed on a processor perform the methods disclosed herein.

BRIEF DESCRIPTION OF THE DRAWINGS

FIGS. 4A-4D illustrate a graphical user interface for the interactive computing service, according to one embodiment.

DETAILED DESCRIPTION

Figure 1:
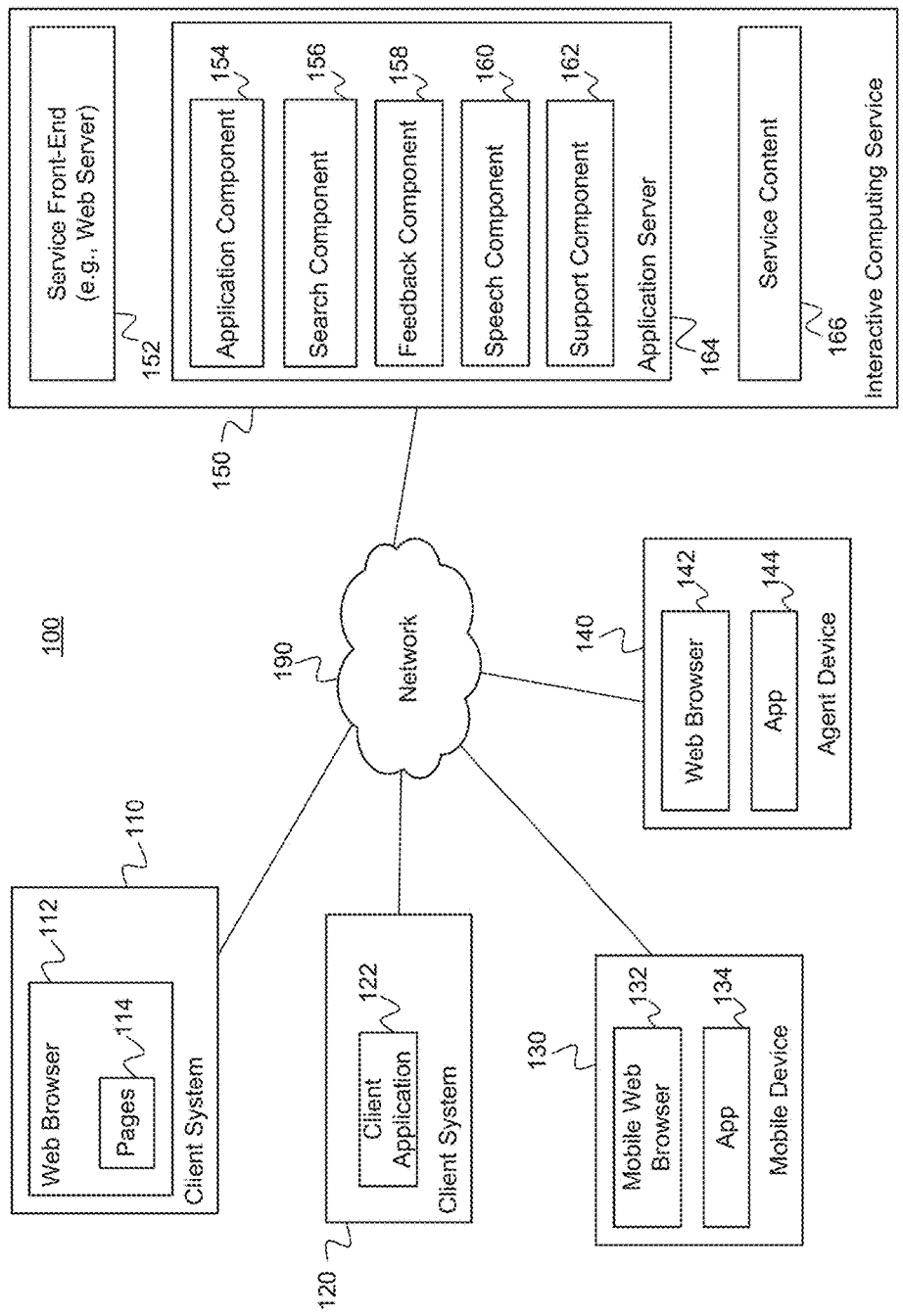
FIG. 1 illustrates an example of a computing environment used to provide an interactive computing service, according to one embodiment.

Software applications and online services often include assisted support features that allow users to interact with a support agent in order to accomplish a particular task. Using an online tax preparation services as a reference example, a user can request assistance with preparing a tax return using the service. In another example, a user can receive assistance from a support agent regarding problems the user experiences using the service. Further, in other examples, users can request assistance from a support service hosted by serviced providers that allow users to complete mortgage applications, generate legal documents, apply for life insurance, and perform other tasks related to building complex documents. Users can receive such assisted support via chat rooms, technical support calls, video support calls, live audio chat, etc., to accomplish a particular task.

Typically, once a user requests to initiate a support encounter, the online service may prompt the user in order to identify the issue (or topic) the user wants help with, attributes of the user (e.g., age, gender, occupation, etc.), sentiment regarding application content, and so on. The online service may use such information to match (or assign) the user to a particular support agent. In addition, the assigned support agent when interacting with the user may further prompt the user for information to determine how to assist the user. However, while a support agent can use the interaction with the user to determine how to assist the user, it may be desirable to provide the support agent with relevant support information and one or more recommendations as to how to assist the user before the support agent begins interacting with the user. Doing so can aid the support agent in assisting the user, and in turn, improve the overall customer support experience of the user with the application.

Embodiments presented herein provide techniques for determining user sentiment regarding application content based on paralinguistic information captured from voice/speech of the user interacting with the application. Such paralinguistic information, for example, can include a set of descriptors characterizing acoustic aspects of the user's voice that are distinct from verbal content associated with the user's voice/speech. Once determined, the online service can notify the support agent of the user's sentiment before the support agent interacts with the user during a support encounter and without prompting the user to provide an indication of sentiment (e.g., such as "Are you satisfied?"). Further, the online service can recommend, based on the user's sentiment, activities for the support agent to use when interacting with the user, e.g., in order to increase the likelihood of achieving a favorable outcome for the support encounter. In this manner, embodiments allow support to be provided more rapidly to customers interacting with an online service.

For example, a user of a software application may interact with the software application using a voice-user interface (VUI). That is, a user can use voice/speech to initiate services or processes in the software application. Continuing with the example of an online tax preparation service, a user can use voice/speech to interact with an interactive workflow (provided by the online tax preparation service) in order to prepare and file a tax return, search self-support content (e.g., such as help content, guides, documentation, user-generated content, etc.), navigate the online tax preparation services, and the like. To the extent the user does use their voice to interact with the application, embodiments herein can capture voice/speech of the user as an audio stream and process the audio stream to extract (or generate) paralinguistic information from the audio stream.

Paralinguistic generally means "alongside linguistics" and therefore deals with those phenomena that are mentioned onto or embedded into a verbal message, including acoustics and linguistics of the verbal message. For example, low level descriptors may be extracted from frames of the audio stream (e.g., 10-30 ms frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the linguistic low level descriptors may include linguistic entities (phoneme sequences, word sequences, etc.), non-linguistic strings (laughter, sighs, etc.), and/or disfluencies (false starts, filled/unfilled pauses, etc.). The paralinguistic information may be extracted utilizing known techniques or software, such as, EmoVoice, OpenEar, Yaafe, Voice Search DB with Accent and Tone, VoiceVault, AT&T APIs, etc.

Once extracted, the online service can process the paralinguistic information of the voice/speech of the user to determine one or more attribute measures of the user (e.g., such as emotional state, gender, age, etc.). For example, the online service (or application) can compare the low level descriptors extracted from the audio stream to a speech database that stores attributes correlated to different low level descriptors. The low level descriptors are then matched to different attributes, examples of which include, but are not limited to, gender of the user, age (or age range) of the user, one or more emotional states of the user (e.g., angry, afraid, positive, negative, joyful, happy, bored, alert, tranquil, excited, warm, aggressive, friendly, gloomy, etc.). Note, however, that the attributes are not expected to always be determined correctly. For example in some cases, the predicted attributes are determined with a probability that they are correct. However, the online service may assign the determined attribute to the user, or if the probability is below a threshold, not assign the determined attribute to the user. In some cases, the online service can prompt the user to input the voice/speech again.

While the user interacts with the application, the online service can determine user sentiment (and/or other user attributes) to different application content, based on the paralinguistic information. For example, assuming is interacting with an interactive workflow to prepare a tax return, the tax preparation service can track the user's progression through each interactive screen (e.g., welcome screen, personal information screen, W-2 data import screen, business deduction screen, etc.) associated with the workflow, and determine the user's sentiment (or emotional state) for each interactive screen, based on paralinguistic information of the user's voice/speech for the screen. In another example, assuming the user interacts with self-support content, the tax preparation service can determine the user's sentiment to one or more of help content, user guides, etc., provided by the tax preparation service, based on paralinguistic information.

The online service may store sentiment measurements and other attributes determined from paralinguistic information (e.g., in a database). In one embodiment, when the user requests to interact with assisted support, the online service can notify a support agent about determined user sentiment regarding different application content, along with any other attributes of the user (e.g., age, gender, etc.) determined from paralinguistic information. Doing so avoids prompting the user with questions to obtain feedback regarding the user's emotional state, and other information. In addition, by informing the support agent of such information (determined from paralinguistic information), the online service can put the support agent assigned to interact with the user in a better position to handle the support call. For example, the online service can notify the support agent ahead of time which areas of the online service the user interacted with while in a negative mood, positive mood, neutral, etc.

Compared to conventional methods used to determine user attributes, the information determined from paralinguistic information can provide a more accurate measure of user sentiment and/or other user attributes. For example, while some information about the emotions of a user may be determined from converting speech to text (e.g., using natural language processing or other methods), using paralinguistic information to determine user sentiment may provide a more accurate measure of user sentiment. For example, assume that a user speaks a specific set of words to initiate a search for eligible business deductions (e.g., "Where can I find a list of business tax deductions?"). In this example, the user may speak such set of words with a negative tone (indicating the user is in a negative mood) that may not be detectable by mere natural language processing to extract the words from the audio stream alone. As such, using paralinguistic information to determine attributes of the user, the online service can more accurately determine sentiment of the user regarding application content.

In addition, techniques presented herein allow the online service to verify attributes of a user interacting with the application. For example, assume one customer using the online service is using another customer's credentials (e.g., a spouse is using the other spouse's user name and password) to use features and/or application content provided by the online service. If, in such situations, the customer decides to contact assisted support, the online service may determine (based on a user profile associated with the credentials) one or more inaccurate attributes of the user (e.g., gender, age, emotional state, etc.). In another example, the online service may not be able to locate a user profile (e.g., the user is unauthenticated). Using the techniques presented herein, however, the online service can determine correct attributes of the actual user interacting with the service based on paralinguistic information of the user's voice/speech captured from the user's session with the online service. Once determined, the online service can provide such information to a support agent in advance in the event the user decides to contact assisted support.

Additionally, embodiments presented herein can recommend actions (or activities) for the support agent to employ when interacting with the user, based on the user sentiment or other attributes determined from the paralinguistic information. For example, if the paralinguistic information indicates that the user is frustrated with a particular workflow included in the online service, the online service can recommend that the support agent help the user with that workflow. The online service can also recommend that the support agent interact with the user in a certain manner (e.g., by saying particular (words) or phrases, using a certain tone, using a certain volume, refraining from saying particular phrases, or other paralinguistic cues), ask if the user needs help with other features of the application (based on the paralinguistic information), and so on. In one embodiment, the online service may use an analytical model to predict the set of recommended actions that increase the likelihood of achieving a positive outcome for the support call (e.g., measured by customer feedback, call support time, customer retention, etc.). Accordingly, using paralinguistic information to recommend actions for a particular user to a support agent assigned to interact with the user can improve users' customer service experience with the online service.

Note, certain embodiments are described using an online tax-preparation service as an' example of computer software and an online software service, etc., that uses paralinguistic features in voice interactions with the user to predict an emotional state of the user. Once predicted, the online tax-preparation service notifies the support agent of the predicted emotional state to increase the likelihood of the support agent achieving a successful outcome for the support encounter. One of ordinary skill in the art will recognize that the techniques described herein may be adapted for use by a broad variety of software applications, online or web services, software features, or support services where users can use voice/speech to interact with the software. Additionally, it should be noted that although, in certain examples described herein, the computing device that captures the audio stream is described as performing certain tasks (e.g., extracting paralinguistic information, speech recognition, action selection, etc.), such tasks may be performed by one or more additional computing devices that the computing device that captures the audio stream is in communication with (e.g., via a wired or wireless network), or vice versa. For example, the audio stream, control signals, and information for display may be communicated between the computing devices, such as described with respect to FIG. 1.

FIG. 1 illustrates an example of a computing environment 100 used to provide an interactive computing service 150 with assisted support, according to one embodiment. As shown, the computing environment 100 includes client systems 110, 120, a mobile device 130, an agent device 140, and an interactive computing service 150, which are each connected to a network 190. The network 190, in general, may be a wide area network (WAN), local area network (LAN), wireless LAN (WLAN), personal area network (PAN), a cellular network, etc. In a particular embodiment, the network 190 is the Internet.

Client systems 110, 120 are included to be representative of a general purpose computing systems, such as a desktop or laptop computer hosting applications used to access the interactive computing service 150. For example, client system 110 includes web browser 112 used to access the interactive computing service 150 by rendering web pages 114 received from the interactive computing service 150. Similarly, client system 120 includes a client application 122. The client application 122 is included to be representative of a component of a client server application (or other distributed application) which can communicate with the interactive computing service 150 over network 190. Client application 122 may be a "thin" client where the processing is largely directed by the client application 122, but performed by computing systems of the interactive computing service 150 or a conventional software application installed on client system 120. Mobile device 130 is included to be representative of a variety of computing devices, such as a mobile telephone or computing tablet. As shown, the mobile device 130 may access the interactive computing service 150 over network 190 using a mobile web browser 132 or local application or "app" 134 executed on the mobile device 130. Agent device 140 is included to be representative of a variety of computing devices, such as a desktop, mobile telephone, computing tablet, laptop, etc. Agent device 140 may access the interactive computing service 150 over network 190 using web browser 142 or "app" 144 executed on the agent device 140.

In one embodiment, web browsers 112, 132, 142, and applications 122, 134, 144 communicate with the interactive computing service 150. For example, referring to client systems 110, 120 and mobile device 130, in the case where interactive computing service 150 offers a tax-preparation service, web browsers 112, 132, client application 122, and application 134 may provide software which guides a user through preparing a tax return as well as provide the user with access to a variety of related features (e.g., self-support content, assisted support content, etc.) available from the interactive computing service 150. Continuing with the tax preparation example, such features may include the ability to file a prepared return via an interactive workflow, to search for help content, user generated content, etc. related to tax topics, to post questions and answers to questions about the service using an online community, or to provide feedback about the usefulness, quality or relevance of content provided by the interactive application or members of the online community. As described herein, in one embodiment, paralinguistic information from voice/speech of a user may be used to adjust a user experience of the interactive computing service 150.

Referring to agent device 140, web browser 142 and application 144 may provide software which allows a support agent to provide support or assist users with accomplishing a particular task. For example, a support agent can use web browser 142 and/or application 144 to access features or content of the interactive computing service 150 that may not be available to users in order to provide support to users. Such features, for example, may include detailed product documentation, access to user accounts for the online service, etc. A support agent can interact with a user for different types of support encounters, examples of which include, but are not limited to, voice telephone call, chat, live audio chat, video call, etc. In some embodiments, the support agent can interact with the user via screen sharing in order to observe and control application features and content on the user's device. For example, the support agent can use application 144 to control application 122 on client system 120, application 134 on mobile device 134, etc.

As shown, the interactive computing service 150 includes a service front-end 152, an application server 164, and a service content database 166. In this example, the interactive computing service 150 is generally modeled as a web server (i.e., service front-end 152), an application server 164, and a database (i.e., service content database 166). Of course, other software architectures or distributed application frameworks could be used. Service front-end 152 and application server 164 are included to be representative of physical computing systems, as well as representative of virtual machine instances deployed to a computing cloud. Service front-end 152 may communicate with application server 164 to respond to requests from applications on client systems 110, 120, mobile device 130, and agent device 140.

The application server 164 includes an application component 154, search component 156, feedback component 158, speech component 160 and support component 162. Continuing with the example of a tax preparation service, the application component 154 may provide one or more software applications which are used to guide a user in preparing a tax return and to access related features and services, e.g., to interact with self-support content or assisted support content. In one embodiment, the application component 154 may respond to requests from clients (e.g., users, support agents, etc.) by generating hypertext markup language (HTML) and related content passed to clients (via the service front-end 152) and rendered as a user interface (e.g., forms, text fields, and so on, along with scripts or applets executed by a web browser). In some cases, the application component 154 may interact with other components of the application server 164 (e.g., such as support component 162) to pass HTML content to support agents. In some cases, the application 122 running on the client 120, the application 134 running on the mobile device 130 and/or the application 144 running on agent device 140 could generate information content to present data retrieved from the application server 164. In general, the application component 154 may be implemented using any suitable software programming language, application framework, web service solution stack, virtual application containers, etc., in order to present application features and content to a client.

In some embodiments, the application server 164 may include one or more graphical user interface (GUI) components that interactive computing service 150 can present on client systems 110, 120, mobile device 130 and agent device 140, based on whether a user is interacting with a workflow (via application component 154), searching for information content (e.g., via search component 156), providing feedback for information content (e.g., via feedback component 158), etc., and/or whether a support agent is interacting with a user (e.g., via support component 162). The GUI components may include, for example, HTML components or code that generates HTML components that can be passed to client systems 110, 120, mobile device 130 and agent device 140 and rendered as a user interface. The GUI components may additionally include instructions executable by client systems or mobile devices to display a user interface. The GUI components may additionally include instructions executable by client systems 110, 120, mobile device 130 and agent device 140 to display a user interface using language-specific or operating system-specific GUI components (e.g., instructions for displaying Win32 forms or similar components on other operating system platforms, Abstract Window Toolkit or Swing API components on the Java platform, and so on). Generally, instructions capable of rendering a GUI on client systems 110, 120, mobile device 130 and agent device 140 may include computer executable code generated from compiling and/or interpreting C (or variants thereof), Java, PHP, Ruby, HTML, javascript, Python, AJAX, VBscript, and other programming or scripting languages used to compose and present a GUI. In an example tax preparation application, application server 164 components may include screens for prompting a user for personal information (e.g., name, address, social security number), income information (from W-2s, 1099s, K-1s, and so on), and various deductions and credits that the user may qualify for, structured feedback (e.g., up-down votes, star ratings, etc.), voice-of-customer feedback, etc. The prompts may be for input of such information via voice/speech of the user. Additionally, the application server 164 components may include prompts (e.g., pop-ups) that display information and/or suggestions relevant to a support call to a support agent interacting with a user.

For example, the GUI on client systems 110, 120, mobile device 130 and/or agent device 140 may include a prompt (e.g., icon, text, button, etc.) that requests a user to speak (e.g., ask a query, speak a command, etc.) for example using natural language. The client systems 110, 120, mobile device 130 and/or agent device 140 may receive the audio stream of the speech of the user, such as via a microphone coupled to or integrated with the client systems 110, 120, mobile device 130 and/or agent device 140. The client systems 110, 120, mobile device 130 and/or agent device 140 may transmit the audio stream, via the network 190, to the application server 164.

The speech component 160 may be used to identify the text (e.g., words, query, etc.) of the audio stream of the voice/speech of the user (e.g., by utilizing speech recognition techniques to convert speech to text). Further, the speech component 160 may be configured to generate (or extract) paralinguistic information from the audio stream and determine (or predict) one or more attribute measurements of the user based on the paralinguistic information (e.g., by utilizing known techniques as discussed herein). The speech component 160 may be configured to provide such identified text and one or more attributes of the user (or paralinguistic information) to the other components of the application server 164 (e.g., such as support component 162).

In one example, the speech component 160 can be configured to track sentiment of a user interacting with the interactive computing service 150. For example, assuming the user is progressing through an interactive workflow to prepare and file a tax return, the speech component 160 can generate, for each interactive screen, paralinguistic information from audio of the user and determine sentiment of the user to application content for the interactive screen based on the paralinguistic information. In one embodiment, the speech component 160 can determine one or more than one emotional state for each interactive screen, based on the paralinguistic information. Put differently, the speech component 160 can determine an array of measures of emotional states for each interactive screen. The speech component 160 can store the array of emotional states (e.g., in a database) for retrieval by other components of the interactive computing service or provide the array of emotional states in response to a request for the emotional states. In addition, the speech component 160 can determine other user attributes (e.g., gender, age (or age range), etc.) based on paralinguistic information of voice/speech of the user captured from the interactive screens. The speech component 160 may store the determined attributes in a user profile in a database for interactive computing service 150. While a user interacts with the interactive computing service 150, the speech component 160 can continually update the user profile with information determined from paralinguistic information.

In some embodiments, the speech component 160 can record change in user sentiment (for multiple screens) or change in sentiment between two interactive screens, etc., as separate predictors of the user's emotional state to the application. For example, the speech component 160 may determine that the user is initially in a positive mood (e.g., from paralinguistic information of the user interacting with a first one or more screens), and then determine that the user's mood has changed to neutral (or negative) (e.g., from paralinguistic information of the user interacting with a second one or more screens). In this example, the speech component 160 can interact with the support component 162 to notify the support agent of when (e.g., the particular interactive screens) the sentiment of the user changed.

The search component 156 may be used to allow users to search for content items or features available from the interactive computing service 150. For example, the search component 156 may evaluate service content database 166 to identify content items responsive to a user query (e.g., based on text from the speech component 160) received as voice/speech of the user. In such a case, the search component 156 could identify a variety of content items or services hosted on the interactive computing service 150, such as user guides, feature documentation, as well as user generated content such as questions posted to an online community of users, user blogs, or syndicated forum posts, etc. and/or identify other actions to take, such as routing a user to assisted support, routing a user to receive feedback from the user, etc. In some cases, the search component 156 may use keywords specified in the user query (e.g., as identified by the speech component 160) to identify content hosted on the interactive computing service 150. For example, assume a user specifies keywords "tax return" in a search for how to prepare a tax return. In response, the search component 156 may identify content items in the server content database 166 that include the keywords "tax return" specified by the user.

The feedback component 158 may be used to capture feedback regarding user experience. For example, a user interacting with the online service may at times be prompted to provide feedback regarding the usefulness of certain features and/or content provided by the online service. Such feedback may be provided in the form of structured feedback (e.g., binary up/down votes, star ratings, etc.), more detailed unstructured feedback (e.g., user comments, voice/speech, etc.), or in general any other form that indicates whether the user was satisfied or dissatisfied with the online service. The feedback component 158 can also extract feedback (e.g., voice of customer feedback) from text inputs of the user. For example, the feedback component 158 can analyze the text content of search queries to determine sentiment of the user (e.g., "I can't find my tax refund" may indicate the user is having a negative experience with the service).

The support component 162 may allow users to interact with support agents in order to receive assistance in accomplishing a particular task. Continuing with the above tax preparation example, such assistance can include help with using the service to submit a completed tax return to the IRS, locating particular tax-related features from the service, answering questions related to where to find information on the requirements for qualifying for a tax credit, etc. Once a user determines to initiate a support encounter, the support component 162 can provide any attributes of the user (determined from paralinguistic information) to a support agent that will be assigned to assist the user. In another example, the support component 162 can retrieve the user's profile (including attributes of the user) from a database hosted by interactive computing service 150.

Additionally, the support component 162 may analyze the user's sentiment to different application content and determine one or more actions (or activities) and/or content for the support agent to employ based on sentiment of the user. For example, the support component 162 can use one or more predictive models to determine a set of actions and/or information content that, if used by the support agent, increase a likelihood of the support agent achieving a positive outcome for the call. As described below with reference to FIG. 3, such predictive models can be trained using techniques such as artificial neural networks, decision trees, logistic regression, machine learning, support vector machines, linear regression, etc. Based on the user's sentiment (and/or other user attributes), the support component 162 can recommend that the support agent speak in a particular manner (e.g., with tone, phrases, volume, etc.), recommend help with other features and/or other applications provided by interactive computing service 150, and the like. In some cases, the support component 162 can identify the relevant area (or topic) the user wants help with without asking the user a series of questions. For example, if the support component 162 determines from the array of sentiment that the user expressed negative sentiment regarding a data-import feature of a tax preparation application, the support component 162 can infer that the support encounter request from the user is about the data-import feature.

In addition, the support component 162 can prompt the support agent with application content (e.g., features and/or services) provided by the interactive computing service 150 to aid the support agent in interacting with the user. For example, assuming the support component 162 determined (from paralinguistic information) that a user was frustrated with identifying differences between different versions of the application (available for purchase), the support component 162 can identify such information in service content database 166 and make the information readily available on the support agent's interface, without the support agent having to spend time to determine that the user (contacting assisted support) wants the information, and/or spend time searching for the relevant information.

Figure 2:
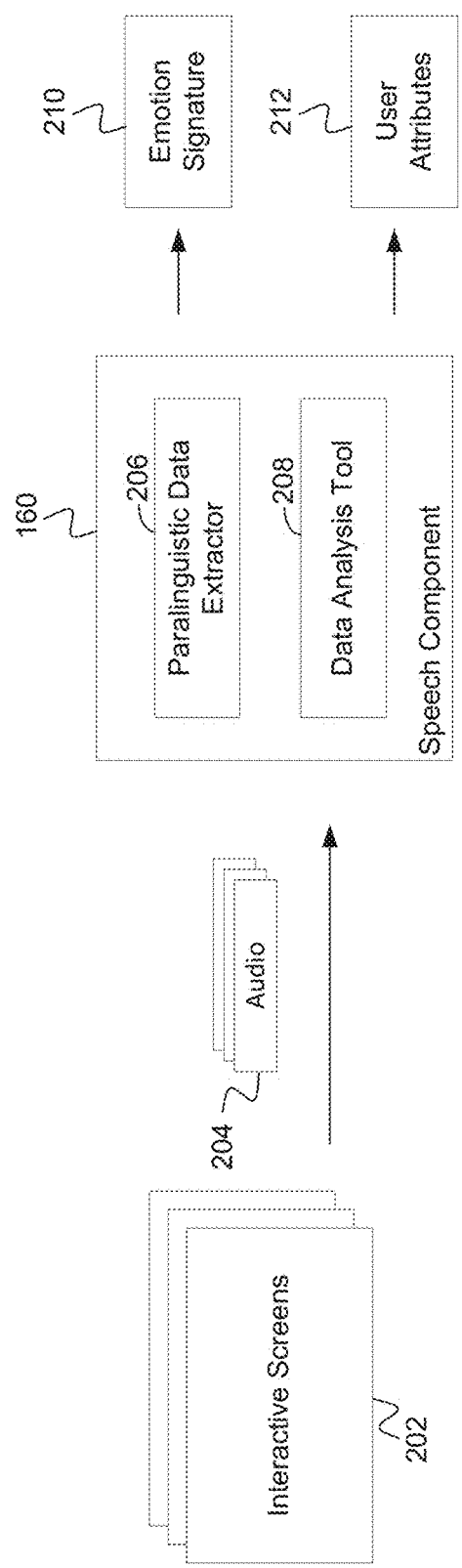
FIG. 2 illustrates components of the interactive computing service used to determine attributes of a user based on paralinguistic information from the user's voice/speech, according to one embodiment.

FIG. 2 further illustrates the speech component 160 described relative to FIG. 1, according to one embodiment. As shown, the speech component 160 includes paralinguistic data extractor 206 and data analysis tool 208. The speech component 160 may track a user interacting with one or more interactive screens 202 provided by the interactive computing service 150, and detect audio 204 of the user for each interactive screen 202. Assuming interactive screens 202 are associated with a tax preparation workflow, audio 204 may include words indicative of a query (e.g., "What is my tax bracket?"), words indicative of a command (e.g., "Please continue to next page?"), words in response to a prompt on an interactive screen (e.g., "Yes" or "No"), etc.

The speech component 160 can use paralinguistic data extractor to generate (or extract) paralinguistic information from the audio 204 and use data analysis tool 208 to predict one or more user attributes based on the paralinguistic information. For example, as shown, the speech component 160 can determine the user's emotional state for each interactive screen (shown collectively in this example as emotion signature 210) and/or other user attributes 212 (e.g., age, gender, etc.) based on the paralinguistic information from the user's voice/speech. In one embodiment, the speech component 160 may determine an array of emotion states for each interactive screen 202. In one example, the speech component 160 may determine each emotional state as a score with a value ranging between −1 to 1, where 1 is associated with high positive emotional state and −1 is associated with a negative emotional state. In general, however, the speech component 160 can use any other suitable range of scores, e.g., 0 to 10, 1 to 100, and so on.

In some embodiments, the speech component 160 can use speech recognition (e.g., using known techniques or software, such as, natural language processing, Hidden Markov models, neural networks, deep feedforward and recurrent neural networks, etc.) on the audio stream to extract words spoken by the user. The words extracted from the audio stream may be indicative of one or more topics that can be provided to other components of the interactive computing service 150.

Figure 3:
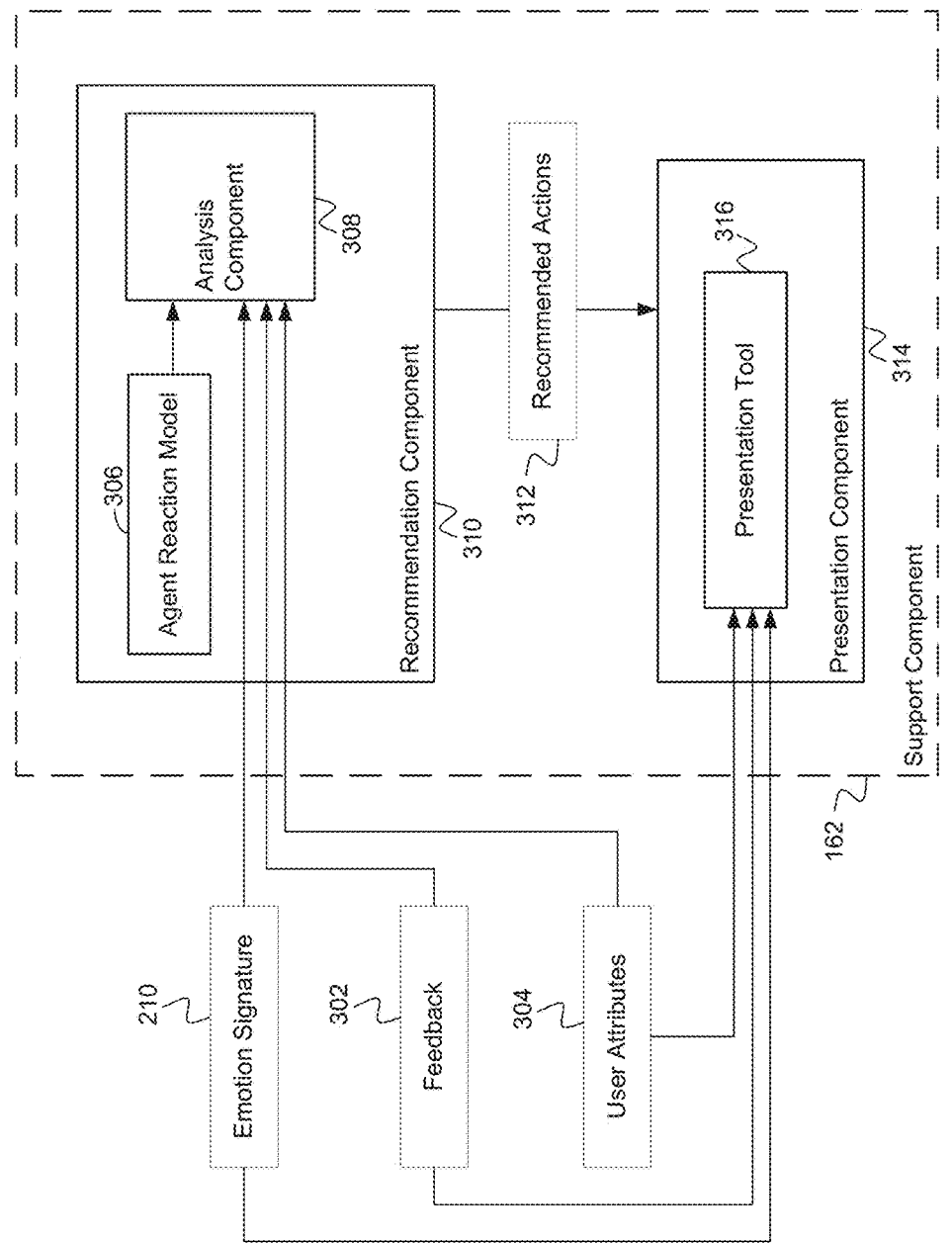
FIG. 3 illustrates components of the interactive computing service used to assist a support agent based on attributes determined from paralinguistic information of a user, according to one embodiment.

FIG. 3 further illustrates the support component 162 described relative to FIG. 1, according to one embodiment. As shown, the support component 162 includes recommendation component 310, which is configured to determine one or more recommended actions 312 for the support agent to use when assisting a user, and presentation component 314, which is configured to provide a support agent's interface with paralinguistic information. For example, the recommendation component 310 includes agent reaction model 306 and analysis component 308.

The recommendation component 310 may receive the user's emotion signature 210 (e.g., via speech component 160), feedback 302 (e.g., via feedback component 158), and/or user attributes 304. Feedback 302 can include structured feedback and/or unstructured feedback received from the user while the user interacted with the interactive computing service 150 before contacting assisted support. When used in addition to sentiment determined from paralinguistic information, such feedback can provide an additional measure of user sentiment regarding application content (e.g., user comments within the feedback 302 indicating the user is frustrated may positively correlate with paralinguistic information indicating the user is frustrated).

User attributes 304 may include other attributes, such as age, gender, occupation, how long the user has been using the application, etc. In one example, one or more of the attributes 304 may be determined from paralinguistic information of the user's voice/speech (e.g., user attributes 304 may include user attributes 212). At the same time, one or more of the attributes 304 may be determined from the user's previous interaction with the interactive computing service 150 (e.g., the user may have provided personal information, employment information, location information, and other details to the interactive computing service 150). In some cases, one or more of the user attributes 304 and/or emotion signature 210 may be determined from a profile of the user stored in a database hosted by the interactive computing service 150. In one embodiment, the user profile may be "unified" user profile maintained by the interactive computing service for different applications hosted by the interactive computing service 150. For example, the interactive computing service 150 could provide financial service applications, tax preparation applications, data management applications, etc., and a user may have a single profile that associated with the different applications.

In response to receiving the user's emotion signature (e.g., via speech component 160), feedback 302, and/or user attributes 304, the analysis component 308 can analyze the received information with agent reaction model 306 and generate recommended actions 312 for a support agent to use when assisting the user. As noted, the agent reaction model 306 is configured to predict (based on at least the user's emotion signature 210) the set of actions that increase the likelihood of the support agent achieving a positive outcome for the support call. In one embodiment, the agent reaction model 306 may be an uplift model (or incremental response model) that predicts the likelihood that an individual behavior will be influenced by a stimulus, intervention, or treatment to a particular user attribute. That is, the uplift model can be used to predict (based on the user sentiment) the set of actions by a support agent that increase likelihood of the user to continue interacting with the interactive computing service 150.

The agent reaction model 306 may have been trained over historical data, including historical emotion signature data of users, historical support agent actions in response to users contacting assisted support, and outcomes of the support calls. The outcome of a given support call can be determined via a post-contact survey with the user, voice input from the user after the support call, whether the user continued to use the interactive computing service after the support call, determining sentiment of the user after the support call during another interaction with the interactive computing service, etc. To train the agent reaction model 306, one or more techniques can be used to identify correlations or other mathematical, statistical, or logical relationships between actions of a support agent to different types of users expressing different emotional states and the likely behavior of the users in response to the actions (e.g., whether the users continued to use the application). These techniques may include methods such as regression, logistic regression, decision trees, artificial neural networks, support vector machines, linear regression, nearest neighbor methods, distance based methods, naïve Bayes, linear discriminant analysis, k-nearest neighbor algorithm, etc.

Once the recommendation component 310 determines a set of recommended actions 312, the recommendation component 310 provides the recommended actions to the presentation component 314. The presentation component 314 includes presentation tool 316, which is configured to select and present information content on the support agent's interface. For example, the presentation tool 316 can display the set of recommended actions 312 and the user's emotion signature 210 associated with application content the user interacted with prior to contacting assisted support. In addition, the presentation tool 316 can display feedback 302 and user attributes 304. In one embodiment, other user attributes determined from paralinguistic information can be passed to the presentation component 314 as part of the recommended actions 312.

In one embodiment, the presentation tool 316 may present prompts or user interfaces based on the recommended actions 312. In one embodiment, the presentation tool 316 can reproduce a mock-up of the application including the application content that the user expressed a negative sentiment towards. For example, if the user expressed negative sentiment in regards to data-import feature of an interactive screen, the presentation tool 316 can reproduce the data-import feature on the support agent's interface along with a prompt that displays relevant information associated with the data-import feature. In another example, the presentation tool 316 can prompt the support agent to with one or more paralinguistic cues (e.g., tone, pitch, volume, etc.) to employ when speaking to the user, based on the user's sentiment. In this manner, the support agent can be in a position to automatically help the user with such feature before interacting with the user.

Figure 4B:
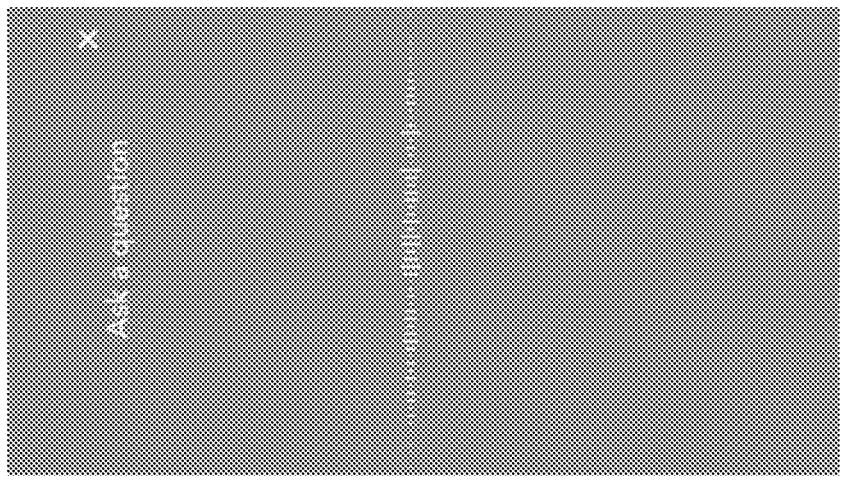
Figure 4A:
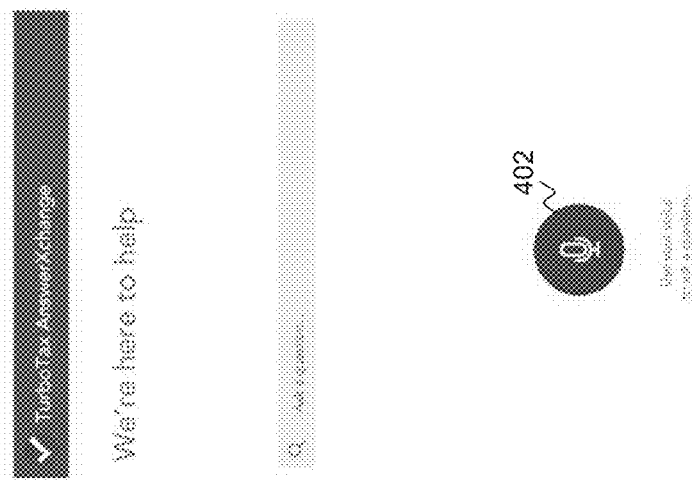

FIGS. 4A-4D illustrate a GUI for capturing the voice/speech of a user. As shown in FIG. 4A, a user is given a prompt to use their voice/speech to control the software application (e.g., online service 150), as displayed on a device (e.g., mobile device 130). The user may, for example, provide an input (e.g., touch on a touch screen of the mobile device 130) at an icon 402 to cause the mobile device 130 to accept a voice/speech of the user as input. The software application may then display a screen as shown in FIG. 4B on the mobile device 130 prompting the user to begin speaking and/or displaying that the mobile device 130 is capturing an audio stream. Still further, as discussed above, the software application may determine a number of content items related to the content of the voice/speech of the user, and display the results as shown in FIG. 4C on the mobile device 130. A user may further provide input (e.g., via voice/speech) on one of the displayed results in FIG. 4C to see details of the results, such as shown in FIG. 4D. The user may further be prompted to provide additional voice/speech input regarding the selected content and/or other application content, e.g., as shown at icon 404 of FIG. 4D.

As discussed above, for each interactive screen that the user provides voice input for, the software application can extract paralinguistic information from the voice input and determine the user's sentiment to application content for the particular interactive screen. Referring to the example in FIG. 4C, if the user speaks the words, "Where is my refund?," the software application can determine (based paralinguistic information extracted from the user's voice) whether the user is in a negative mood, frustrated, happy, etc. Once determined, the software application can store such information in a profile maintained for the user. In the event the user attempts to contact assisted support, the software application can notify the support agent that will be assigned to handle the call about the user's sentiment for the interactive screen shown in FIG. 4C. For example, if the user expressed frustration during this part of the interactive session, the software application can inform the support agent of the user's frustration with searching for their refund.

As noted above, in this example, the software application may infer the topic associated with the support request based on the user's paralinguistic emotion signature to each screen. For example, assume the user speaks the words "Is that my tax refund?" with a tone indicating the user is upset and frustrated. In such a case, even if the software application converts speech to text (e.g., using natural language processing), the software application may not be able to identify that the user is frustrated with the tax refund information. At the same time, the software application may infer from the negative user sentiment associated with this particular page (displaying the tax refund information) that the topic of the support encounter is related to tax refunds, and notify the support agent, e.g., without prompting the user for the reason for initiating the support request. In another example, users who start with a "free" version of an application to file federal taxes may become frustrated after learning that they have to pay extra in order to file state taxes. In such situations, the support component 162 can infer, e.g., from negative sentiment determined from paralinguistic information of the user to a screen displaying prices for filing state taxes that the user contacting assisted support to discuss prices of the different versions of the application.

Figure 5:
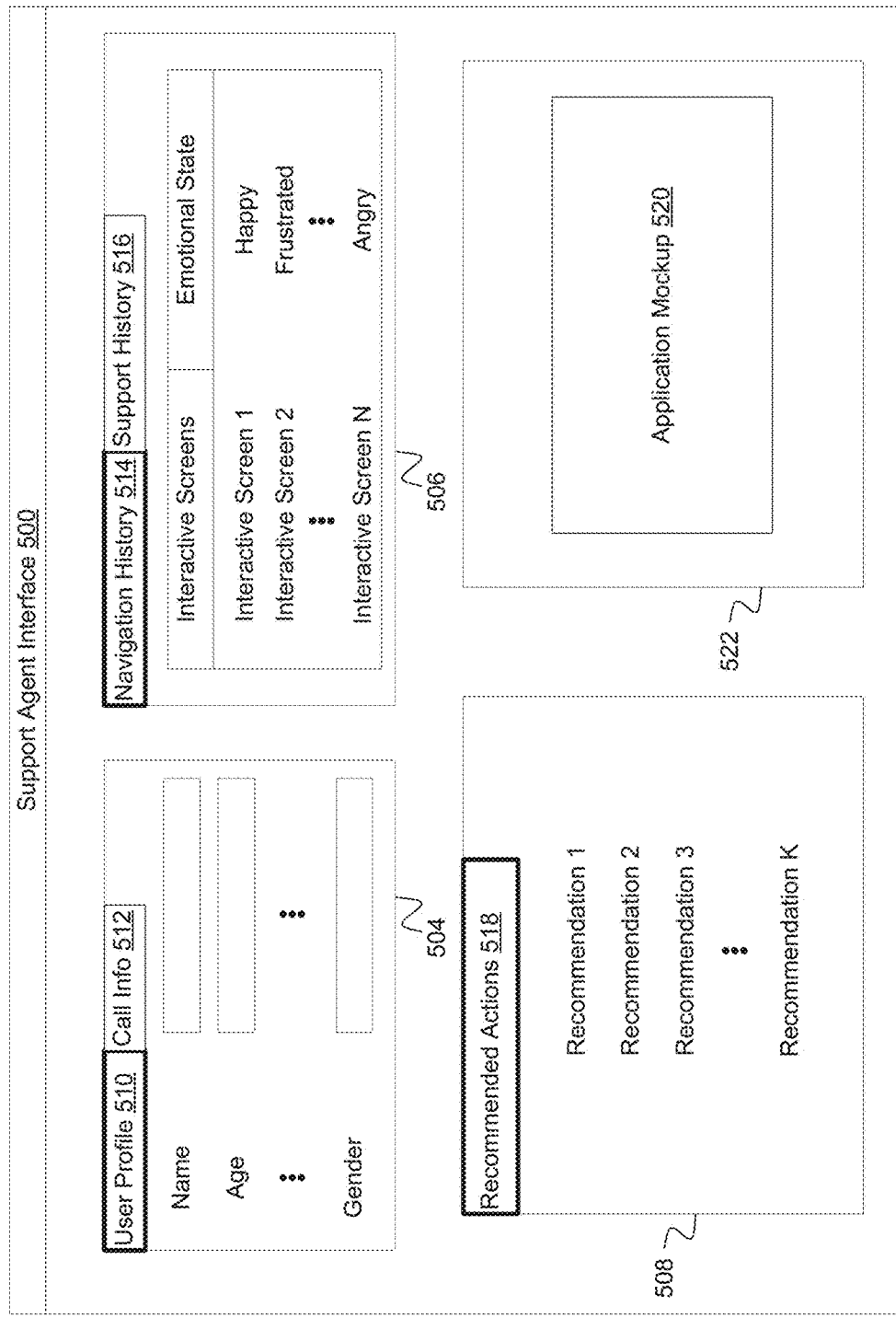
FIG. 5 illustrates an interface for a support agent, according to one embodiment.

FIG. 5 illustrates an interface (e.g., GUI) 500 of a support agent assigned to interact with a user that contacts assisted support. As shown in this example, the support agent is provided with panels 504, 506, 508 and 522, each including different information associated with the particular user. Panel 504 may allow the support agent to select user profile information 510, e.g., to display information associated with the user (e.g., user attributes 304) and call information 512, e.g., to display information associated with the current call, such as topic of the call, call duration, etc. Panel 506 allows the support agent to select navigation history 514 and support history 516. In this example, navigation history 514 (which is currently selected) shows the paralinguistic emotional state for the user for each interactive screen. Panel 508 displays a set of recommended actions 518 (determined by the support component 162) that the support agent can employ when assisting the user. Continuing with the above example, assuming the support agent was notified that the user expressed frustration during the interactive screen shown in FIG. 4C, the recommended actions 518 could include one or more suggestions on how the support agent can best interact with a user expressing frustration to such a problem. In addition, the support agent can be provided with an application mockup 520 within panel 522 to assist the support agent in interacting with the user.

Note that the support agent interface 500 is provided herein as a reference example of the type of information based on paralinguistic information that can be presented to a support agent. More generally, those of ordinary skill in the art will recognize that other types and/or formats of information based on paralinguistic information can be used, as well as other types of interfaces.

Figure 6:
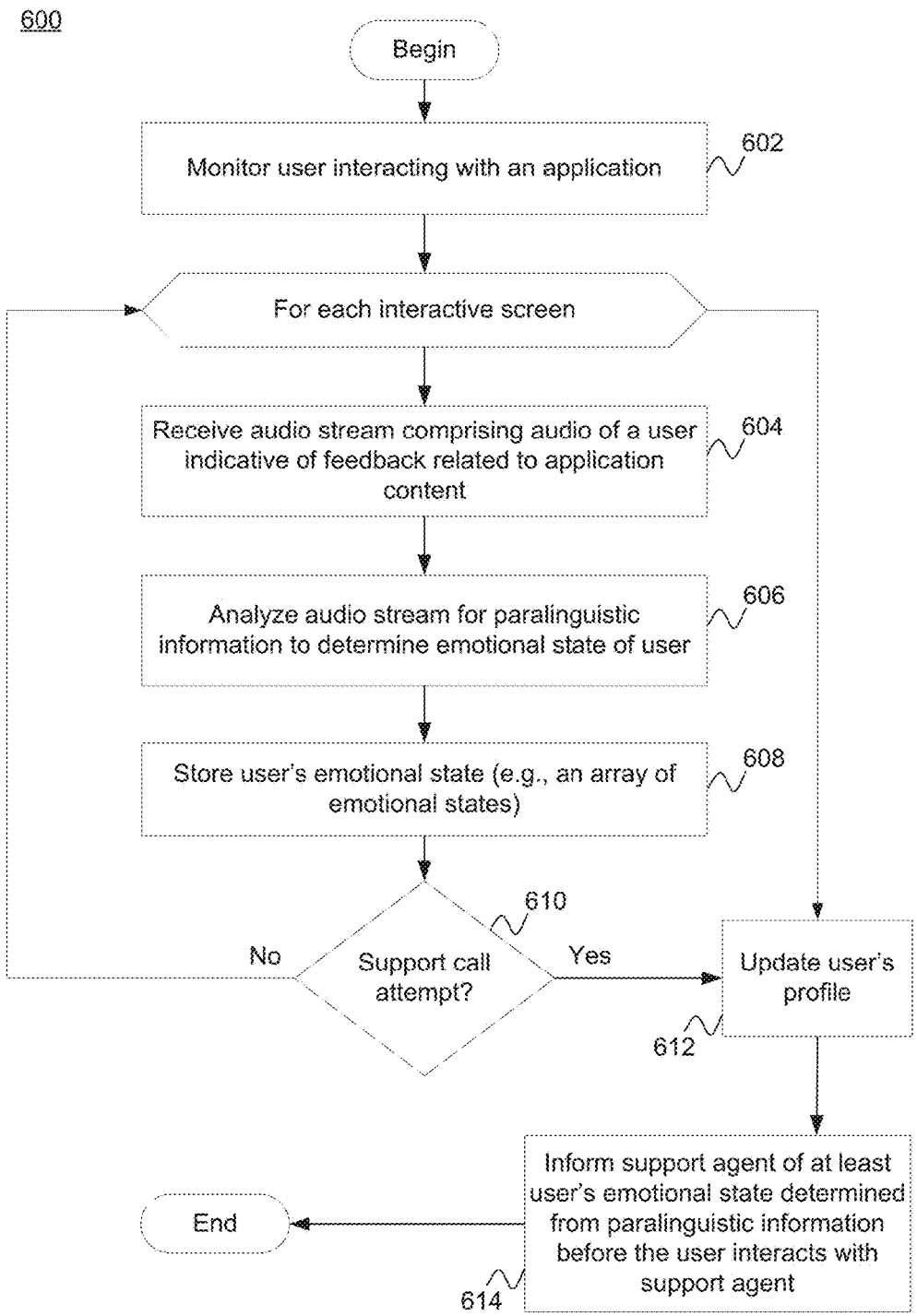
FIG. 6 illustrates a method for informing a support agent of a paralinguistic emotion signature of a user, according to one embodiment.

FIG. 6 illustrates a method 600 for informing a support agent of a paralinguistic emotion signature of a user, according to one embodiment. As shown, the method 600 begins at step 602, where the application (e.g., an online tax-preparation service) monitors (or detects) a user interacting with an application. For each interactive screen of the application, at 604, the application receives (if available) an audio stream comprising audio of the user indicative of feedback related to application content for the interactive screen. At 606, the application analyzes the audio stream for paralinguistic information to determine an emotional state (or sentiment) of the user to application content for the interactive screen. At 608, the application stores the user's emotional state (e.g., in a database, user profile located in the database, etc.). As noted, in one embodiment, the application stores the user's emotional state as an array of measures of emotional states for the interactive screen. At 610, the application determines if the user has made an attempt to contact assisted support (e.g., receive a request to initiate a support encounter). If not, the application proceeds to perform steps 604-610 for a different interactive screen visited by the user.

On the other hand, if the application, at 610, detects an attempt by the user to contact assisted support, the application, at 612, updates the user's profile with any attributes determined from paralinguistic information for the interactive screens visited by the user. The application then informs a support agent that will be assigned to interact with the user during the support call of at least the user's emotional state determined from the paralinguistic information (e.g., before the user interacts with the support agent).

Figure 7:
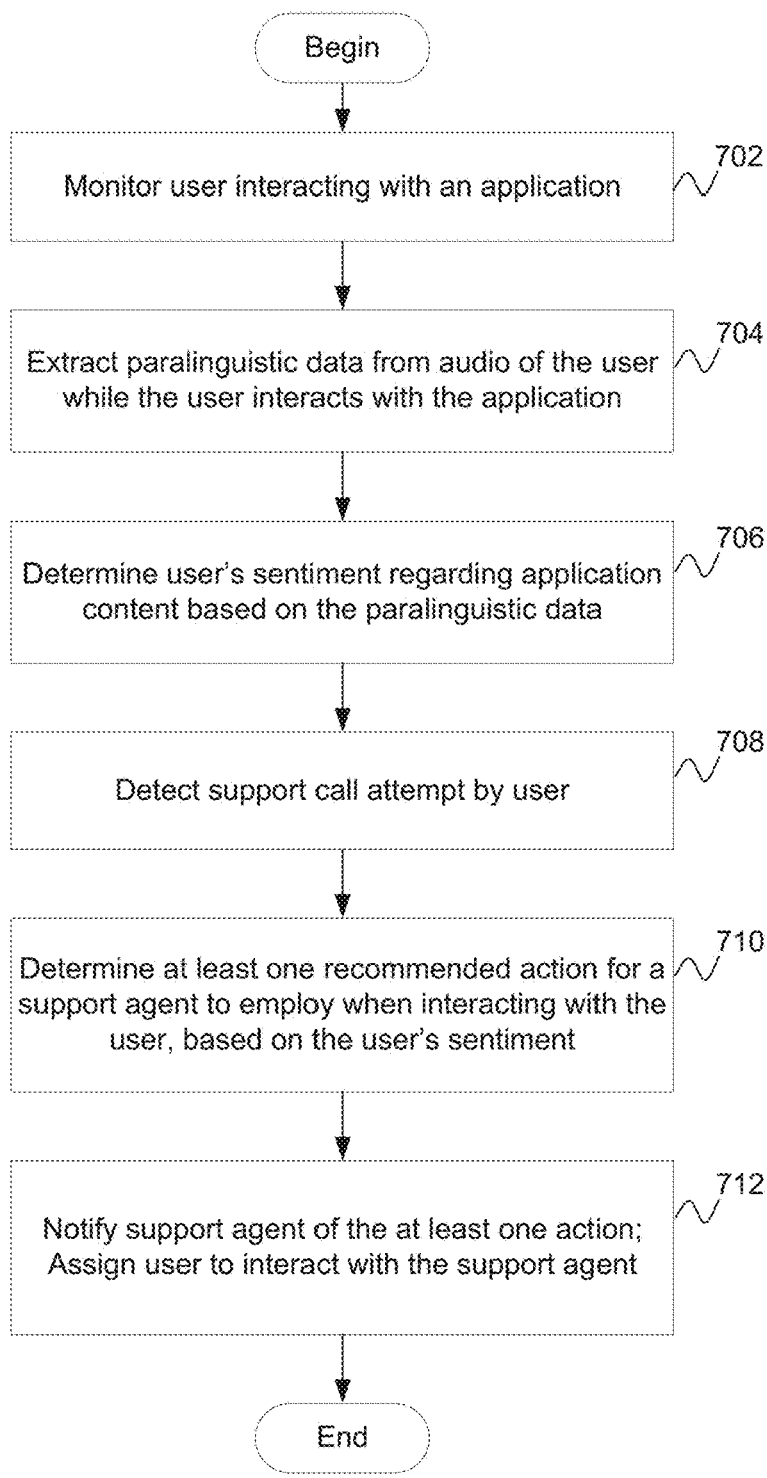
FIG. 7 illustrates a method for determining one or more actions for a support agent to use when interacting with a user, according to one embodiment.

FIG. 7 illustrates a method 700 for determining one or more actions for a support agent to use when interacting with a user during a support encounter, according to one embodiment. As shown, the method 700 begins at step 702, where the application (e.g., an online tax-preparation service) monitors (or detects) a user interacting with an application. At 704, the application extracts paralinguistic data from audio of the user while the user interacts with the application. At 706, the application determines the user's sentiment regarding application content based on the paralinguistic data. At 708, the application detects a support call attempt by the user. Once detected, at 710, the application determines at least one activity for a support agent that will be assigned to handle the support call to use when interacting with the user, based on the user's sentiment. At 712, the application notifies the support agent of the at least one activity and assigns the user to interact with the support agent.

Figure 8:
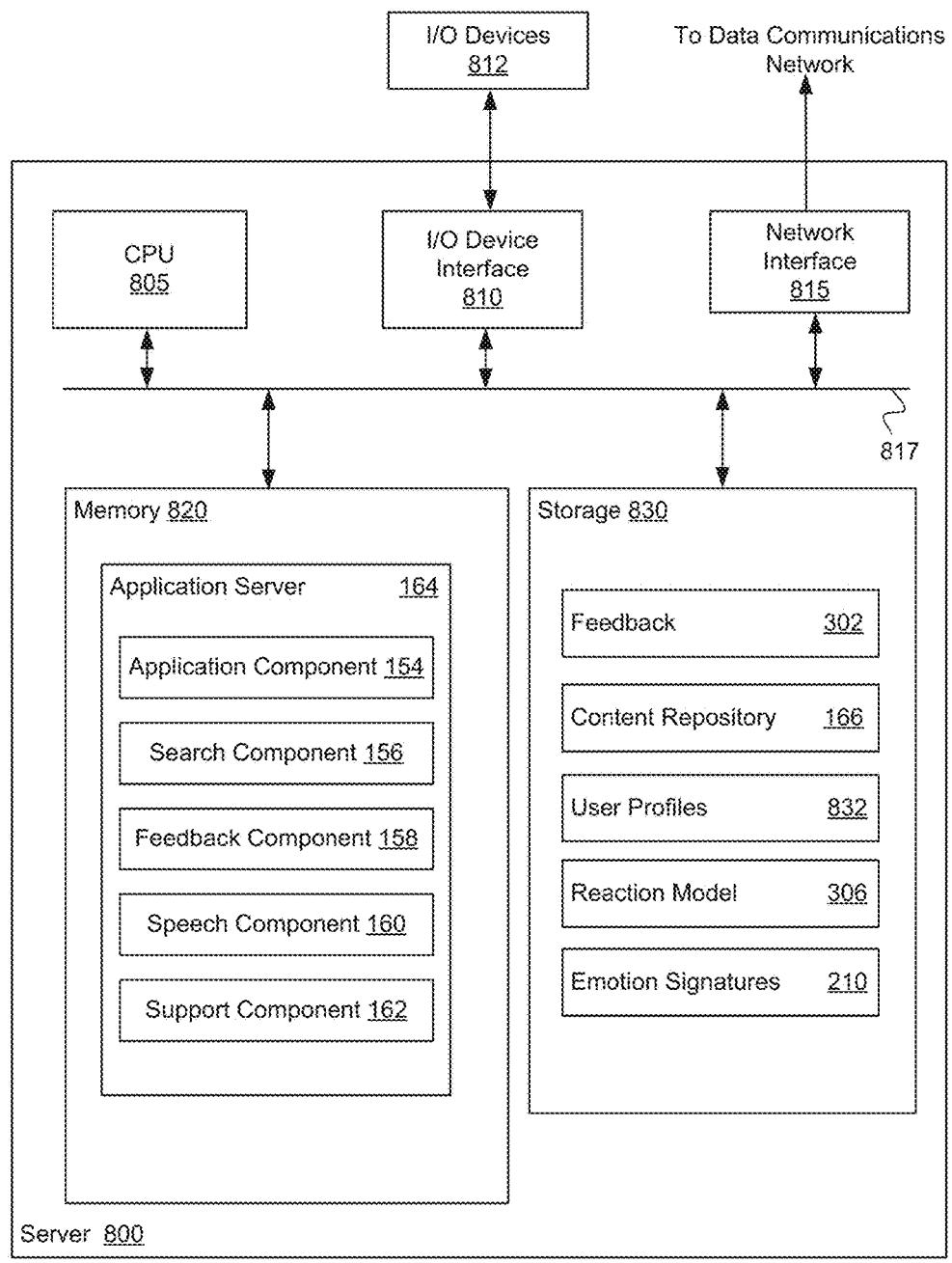
FIG. 8 illustrates an example computing system used to assist a support agent during a support encounter, according to one embodiment.

FIG. 8 illustrates an example computing system 800 used to inform a support agent of at least a paralinguistic emotion signature of a user, according to one embodiment.

As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stored in the storage 830. The bus 817 is used to transmit programming instructions and application data between the CPU 805, I/O device interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes an application server 164, which includes an application component 154, search component 156, feedback component 158, speech component 160, and support component 162, all of which are discussed in greater detail above. Further, storage 830 includes feedback 302, content repository 166, user profiles 832, reaction model 306 and emotion signatures 210.

Advantageously, the techniques presented herein allow an online service to track and determine user sentiment (based on paralinguistic information of a user's voice/speech) regarding different application content provided by the online service, and notify a support agent of the user's sentiment (along with other attributes determined from paralinguistic information) to assist the support agent in handling the support call. Additionally, techniques presented herein can determine (based on the paralinguistic information) a set of actions for the support agent to use while interacting with the user that increase a likelihood of achieving a positive outcome for the support call. Doing so can improve the user's experience with assisted support provided by the online service.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for assisting a support agent assigned to interact with a user during a support encounter, comprising:
   receiving, at a computing device, an audio stream comprising audio of a user interacting with an application;
   evaluating the audio stream to identify a collection of paralinguistic information present in the audio stream, wherein the paralinguistic information comprises a set of descriptors characterizing acoustic aspects of the audio that are distinct from verbal content of the audio;
   determining, from the paralinguistic information, one or more attribute measures associated with the user interacting with the application; and
   upon receiving a request to initiate a support encounter:
      generating, before a support agent assigned to handle the support encounter interacts with the user and based on evaluating at least one of the attribute measures with an uplift model, a set of activities for the support agent to use when interacting with the user that increases a likelihood of achieving a specified outcome for the support encounter;
      providing information content on a support agent interface before the support agent interacts with the user, the information content comprising the one or more attribute measures determined from the paralinguistic information and the generated set of activities, wherein the one or more attribute measures comprises an emotional state of the user responsive to at least one content item provided by the application; and
      generating, before the support agent interacts with the user, a mockup of the application on the support agent interface, the mockup comprising the at least one content item.

2. The computer-implemented method of claim 1, wherein the one or more attribute measures further comprises at least one of a gender of the user and an age of the user.

3. The computer-implemented method of claim 1, wherein the emotional state of the user is a negative emotional state of the user in response to the at least one content item provided by the application.

4. The computer-implemented method of claim 1, wherein the set of activities comprises at least one of identifying first content items to the user, and avoiding presenting second content items to the user.

5. The computer-implemented method of claim 1, further comprising:
   determining, based on the one or more attribute measures, at least one topic associated with the user's request to initiate the support encounter, wherein the at least one topic is not identified in the verbal content of the audio; and
   notifying the support agent of the at least one topic before the support agent interacts with the user.

6. The computer-implemented method of claim 5, wherein the at least one topic is determined without prompting the user to explain a reason for initiating the request for the support encounter.

7. The computer-implemented method of claim 1, wherein the emotional state of the user is a positive emotional state of the user in response to the at least one content item provided by the application.

8. A computing device for assisting a support agent assigned to interact with a user during a support encounter, the computing device comprising:
   a memory; and
   a processor configured to:
      receive an audio stream comprising audio of a user interacting with an application;
      evaluate the audio stream to identify a collection of paralinguistic information present in the audio stream, wherein the paralinguistic information comprises a set of descriptors characterizing acoustic aspects of the audio that are distinct from verbal content of the audio;
      determine, from the paralinguistic information, one or more attribute measures associated with the user interacting with the application; and
      upon receiving a request to initiate a support encounter:
         generate, before a support agent assigned to handle the support encounter interacts with the user and based on evaluating at least one of the attribute measures with an uplift model, a set of activities for the support agent to use when interacting with the user that increases a likelihood of achieving a specified outcome for the support encounter;
         provide information content on a support agent interface before the support agent interacts with the user, the information content comprising the one or more attribute measures determined from the paralinguistic information and the generated set of activities, wherein the one or more attribute measures comprises an emotional state of the user responsive to at least one content item provided by the application, and generate, before the support agent interacts with the user, a mockup of the application on the support agent interface, the mockup comprising the at least one content item.

9. The computing device of claim 8, wherein the one or more attribute measures further comprises at least one of a gender of the user and an age of the user.

10. The computing device of claim 8, wherein the emotional state of the user is a negative emotional state of the user in response to the at least one content item provided by the application.

11. The computing device of claim 8, wherein the set of activities comprises at least one of identifying first content items to the user, and avoiding presenting second content items to the user.

12. The computing device of claim 8, wherein the processor is further configured to:
determine, based on the one or more attribute measures, at least one topic associated with the user's request to initiate the support encounter, wherein the at least one topic is not identified in the verbal content of the audio; and
notify the support agent of the at least one topic before the support agent interacts with the user.

13. The computing device of claim 12, wherein the at least one topic is determined without prompting the user to explain a reason for initiating the request for the support encounter.

14. The computing device of claim 8, wherein the emotional state of the user is a positive emotional state of the user in response to the at least one content item provided by the application.

15. A non-transitory computer-readable medium comprising instructions that when executed by a computing device cause the computing device to perform a method for assisting a support agent assigned to interact with a user during a support encounter, the method comprising:
receiving an audio stream comprising audio of a user interacting with an application;
evaluating the audio stream to identify a collection of paralinguistic information present in the audio stream, wherein the paralinguistic information comprises a set of descriptors characterizing acoustic aspects of the audio that are distinct from verbal content of the audio;
determining, from the paralinguistic information, one or more attribute measures associated with the user interacting with the application; and
upon receiving a request to initiate a support encounter:
generating, before a support agent assigned to handle the support encounter interacts with the user and based on evaluating at least one of the attribute measures with an uplift model, a set of activities for the support agent to use when interacting with the user that increases a likelihood of achieving a specified outcome for the support encounter;
providing information content on a support agent interface before the support agent interacts with the user, the information content comprising the one or more attribute measures determined from the paralinguistic information and the generated set of activities, wherein the one or more attribute measures comprises an emotional state of the user responsive to at least one content item provided by the application; and
generate, before the support agent interacts with the user, a mockup of the application on the support agent interface, the mockup comprising the at least one content item.

16. The non-transitory computer-readable medium of claim 15, wherein the one or more attribute measures further comprises at least one of a gender of the user and an age of the user.

17. The non-transitory computer-readable medium of claim 15, wherein the emotional state of the user is a negative emotional state of the user in response to the at least one content item provided by the application.

18. The non-transitory computer-readable medium of claim 15, wherein the set of activities comprises at least one of identifying first content items to the user, and avoiding presenting second content items to the user.

19. The non-transitory computer-readable medium of claim 15, the method further comprising:
determining, based on the one or more attribute measures, at least one topic associated with the user's request to initiate the support encounter, wherein the at least one topic is not identified in the verbal content of the audio; and
notifying the support agent of the at least one topic before the support agent interacts with the user.

20. The non-transitory computer-readable medium of claim 15, wherein the emotional state of the user is a positive emotional state of the user in response to the at least one content item provided by the application.

* * * * *